(12) United States Patent
Beinat et al.

(10) Patent No.: US 9,625,620 B2
(45) Date of Patent: Apr. 18, 2017

(54) OPTICAL ARTICLE COATED WITH A SUB-LAYER AND WITH A HEAT-RESISTANT, MULTILAYERED ANTIREFLECTION COATING, AND METHOD FOR PRODUCING SAME

(75) Inventors: Olivier Beinat, Charenton le Pont (FR); Jean-Louis Sirjean, Charenton le Pont (FR); Michele Thomas, Charenton le Pont (FR)

(73) Assignee: ESSILOR INTERNATIONAL (COMPAGNIE GENERALE D'OPTIQUE), Charenton Le Pont (FR)

( * ) Notice: Subject to any disclaimer, the term of this patent is extended or adjusted under 35 U.S.C. 154(b) by 980 days.

(21) Appl. No.: 12/306,228

(22) PCT Filed: Jun. 26, 2007

(86) PCT No.: PCT/FR2007/051537
§ 371 (c)(1),
(2), (4) Date: Aug. 18, 2009

(87) PCT Pub. No.: WO2008/001011
PCT Pub. Date: Jan. 3, 2008

(65) Prior Publication Data
US 2012/0075705 A1    Mar. 29, 2012

(30) Foreign Application Priority Data

Jun. 28, 2006 (FR) .................................. 06 52690

(51) Int. Cl.
G02B 1/116 (2015.01)
(52) U.S. Cl.
CPC .................................... G02B 1/116 (2013.01)
(58) Field of Classification Search
CPC . G02B 1/10; G02B 1/105; G02B 1/11; G02B 1/113; G02B 1/115; G02B 1/116;
(Continued)

(56) References Cited

U.S. PATENT DOCUMENTS 6,175,450 B1 *  1/2001 Andreani et al. ............. 359/586
6,606,196 B2    8/2003 Mitsuishi et al. ............ 359/582
(Continued)

FOREIGN PATENT DOCUMENTS

JP          05011101          1/1993
JP          05034502          2/1993
(Continued)

OTHER PUBLICATIONS

International Search Report, issued Int. App. No. PCT/FR2007/051537, mail date Dec. 10, 2007.
(Continued)

*Primary Examiner* — Kimberly N Kakalec
(74) *Attorney, Agent, or Firm* — Norton Rose Fulbright US LLP

(57) ABSTRACT

The invention relates to an optical article having antireflection properties, optionally antistatic properties, having a high thermal and abrasion resistance, as well as the method for producing the same.

The article of the invention comprises a substrate and, starting from the substrate:
  a sub-layer comprising a $SiO_2$-based layer, said $SiO_2$-based layer having a thickness greater than or equal to 75 nm et free from $Al_2O_3$; and
  a multilayered antireflection coating comprising a stack consisting in at least one high refractive index layer and at least one low refractive index layer, all the low refractive index layers of which comprising a mixture of $SiO_2$ and $Al_2O_3$, and the high refractive index layers of which are not layers that do absorb in the visible region comprising a substoichiometric titanium oxide and reducing the relative visible light transmission
(Continued)

factor (Tv) of the optical article by at least 10% as compared to a same article without any of said visible light absorbing layers.

19 Claims, 1 Drawing Sheet

(58) Field of Classification Search
CPC ... G02B 1/14; G02B 1/16; G02B 5/28; G02B 5/285
USPC .................................. 359/586–588, 581–582
See application file for complete search history.

(56) References Cited

U.S. PATENT DOCUMENTS

| | | | | |
|---|---|---|---|---|
| 2002/0060848 A1* | 5/2002 | Mitsuishi et al. | ............ | 359/586 |
| 2002/0110692 A1* | 8/2002 | Suzuki et al. | ............ | 428/411.1 |
| 2004/0067351 A1* | 4/2004 | Helmstetter et al. | ......... | 428/212 |
| 2005/0219724 A1 | 10/2005 | Teramoto et al. | ............ | 359/586 |
| 2006/0164740 A1* | 7/2006 | Sone et al. | .................... | 359/883 |

FOREIGN PATENT DOCUMENTS

| | | |
|---|---|---|
| JP | 2001-013305 | 1/2001 |
| JP | 2003-294906 | 10/2003 |
| JP | 2004-341052 | 12/2004 |
| WO | WO 96/41215 | 12/1996 |
| WO | WO 01/55752 | 8/2001 |
| WO | WO 2005001525 A1 * | 1/2005 |
| WO | WO 2005/059603 | 6/2005 |

OTHER PUBLICATIONS

Office Communication issued in Japanese Patent Application No. 2009-517351, dated Jul. 17, 2012.

* cited by examiner

OPTICAL ARTICLE COATED WITH A SUB-LAYER AND WITH A HEAT-RESISTANT, MULTILAYERED ANTIREFLECTION COATING, AND METHOD FOR PRODUCING SAME

This application is a national phase application under 35 U.S.C. §371 of International Application No. PCT/FR2007/051537 filed 26 Jun. 2007, which claims priority to French Application No. 0652690 filed on 28 Jun. 2006. The entire text of each of the above-referenced disclosures is specifically incorporated herein by reference without disclaimer.

The present invention relates generally to an optical article comprising a substrate provided with a multilayered antireflection coating having an increased heat resistance and a good abrasion resistance, in particular an ophthalmic lens for spectacles, as well as a method for producing such an article.

In the ophthalmic optics field, ophthalmic lenses are traditionally provided with various coatings so as to give these lenses a plurality of mechanical and/or optical properties. Successive coating layers are thus traditionally formed onto an ophthalmic lens, such as impact-resistant coating layers, abrasion-resistant coating layers and/or anti-reflection coating layers.

As defined hereunder, an antireflection coating means a coating that has been deposited onto the surface of an optical article, which does improve the antireflective properties of the optical end product. It makes it possible to reduce the light reflection at the article-air interface area within a relatively large portion of the visible light spectrum.

Antireflection coatings are well known and do traditionally comprise a monolayered stack or a multilayered stack of dielectric materials such as SiO, $SiO_2$, $Al_2O_3$, $MgF_2$, LiF, $Si_3N_4$, $TiO_2$, $ZrO_2$, $Nb_2O_5$, $Y_2O_3$, $HfO_2$, $Sc_2O_3$, $Ta_2O_5$, $Pr_2O_3$, or mixtures thereof.

As is also well known, antireflection coatings are preferably multilayered coatings comprising high refractive index layers and low refractive index layers, alternately.

It is known to interleave a sub-layer between the substrate and the antireflection coating to improve the abrasion resistance and/or the anti-scratch resistance of said coating.

Generally speaking, traditional antireflection coatings have a good heat resistance up to temperatures of about 70° C. When the temperature does exceed this value, cracks may appear in the antireflection stacking, especially on the substrate surface of the article, which indicates that the antireflection coating has been damaged. In the present application, the critical temperature of an article or a coating is defined as being that from which crackings can be observed.

When the substrates are made of organic glass (synthetic resin), depositing the optional sub-layer and antireflection coating must be done by means of methods using moderate temperatures so as to avoid any damage to the substrate, a precaution that has not to be taken with substrates made of mineral glass.

As a result, with substrates made of organic glass, a less durability of the antireflection coating can be observed, especially a lower adhesion of such coating to the substrate, as well as lower heat resistance properties.

In addition, substrates made of organic glass having a higher thermal expansion coefficient as compared to the substrates made of mineral glass or to inorganic materials forming the sub-layers or the layers of an antireflection coating, they do result in articles that may develop high strains leading to crackings.

Some patents do describe how to substitute silica—the most common material—in one or more low refractive index layer(s) of an antireflection stack, with other materials such as alumina-doped silica, so as to obtain improved properties.

The US application 2005/0,219,724 describes an optical article coated with a multilayered dielectric film such as an antireflection coating, comprising high refractive index layers ($TiO_2$) and low refractive index layers, alternately. All low refractive index layers are based on $SiO_2$ doped with a small amount of $Al_2O_3$ so as their refractive index (noted n) to be 1.47.

This document does recommend not to use low refractive index layers consisting solely in $SiO_2$ (n=1.46), as such layers do result in films which will develop high compressive stress, making it thus impossible to obtain a long-lasting film with good adhesion properties to the substrate. Using a mixture of $SiO_2$ and $Al_2O_3$ enables to reduce stress in the low refractive index layers, and thus the probability of crackings on the substrate surface.

The Russian patent SU 1,176,280 describes a substrate coated with a stacking consisting in five high refractive index ($ZrO_2$, n=1.95-2.05) et low refractive index layers ($SiO_2$ doped with 3% $Al_2O_3$, n=1.45-1.47), alternately.

The patent application WO 2005/059603, in the name of the applicant, describes an article comprising a multilayered, coloured antireflection coating provided with at least two high refractive index layers that do absorb in the visible region and that are based on substoichiometric titanium oxide $TiO_x$ (x<2), and preferably at least one low refractive index layer (LI) based on $SiO_2$ doped with 1-5% by weight of $Al_2O_3$, as related to the total weight of $SiO_2$ and $Al_2O_3$. Such a LI layer does improve the service life of the coating and the colouration uniformity. The relative visible light transmission factor (Tv) of the article is at most of 40% and most preferably of about 15%.

This document does more particularly describe a substrate that has been successively coated with a 100-110 nm-thick silica sub-layer (having an anti-scratch function), with a $TiO_x$ layer, a $SiO_2/Al_2O_3$ layer, a $TiO_x$ layer, a $SiO_2/Al_2O_3$ layer, a $TiO_x$ layer, a $SiO_2/Al_2O_3$ layer and with an antifouling coating layer. There is nothing about the problem of making a thermal resistant article.

The Japanese patent H05-011101 describes the preparation of optical articles having initially a good thermal resistance and which heat resistance properties that unavoidably decrease with the time, are maintained to a high degree for several months. These two characteristics are obtained by using a $SiO_2/Al_2O_3$ sublayer, the refractive index n of which does range from 1.48 to 1.52.

The optical article described in this patent does thus comprise a substrate coated with said sub-layer (thickness of from 0.125λ, to 0.8λ, with λ=500 nm) and with an antireflection stack comprising a high refractive index layer interleft between two low refractive index layers. The low refractive index layer that is the most distant from the substrate is always a very thick $SiO_2$ layer (0.25λ). The sub-layer enables to improve the critical temperature at which cracks do appear on the substrate surface, that does range from about 100 to 105° C. at the first stage.

The Japanese patent H05-034502 suggests an alternative to the invention described hereinabove, wherein the $SiO_2/Al_2O_3$ sublayer with the refractive index n=1.48-1.52 has been replaced with a laminated sub-layer comprising the three following layers: a $SiO_2$ layer with a weak thickness (0.05λ to 0.15λ) and with a refractive index n=1.45-1.47, a $Ta_2O_5$ layer with a very weak thickness (0.01λ to 0.10λ) and with a refractive index n=2.0-2.1, and a $SiO_2/Al_2O_3$ layer with a refractive index n=1.48-1.52 that is thicker than the one described in the patent H05-011101 (0.75λ to 1.50λ), these three layers being deposited onto the substrate in the order they were mentioned. The critical temperature at which cracks do appear on the substrate surface, mentioned in the patent H05-034502 ranges from about 95 to 120° C. at the first stage thanks to this sub-layer substantially consisting in a $SiO_2/Al_2O_3$ layer. Moreover all the low refractive index layers of the antireflection coating do not consist in $SiO_2/Al_2O_3$.

However it is preferred to avoid the preparation of such a laminated sub-layer so as not to increase the number of deposition procedures.

It is therefore an object of the present invention to provide a transparent optical article, especially an ophthalmic lens, comprising a substrate made of mineral or organic glass, a sub-layer and an antireflection stack that does counteract the drawbacks of the prior art while preserving excellent properties as regards the transparency and the lack of any optical defect, as well as the ability to resist to temperature fluctuations.

The optical articles of the invention also have an excellent resistance to photodamaging by light radiation, especially by ultraviolet radiation.

They also have a good resistance to a dip treating in hot water followed with a superficial mechanical strain.

Another object of the present invention consists in providing an optical article provided with antistatic and good abrasion resistance properties.

A further object of the present invention is to provide a method for producing an article such as defined hereinabove, that can be easily included into a traditional making process and that does avoid any heating of the substrate.

The present invention was conceived to solve the problem of the thermal resistance of the antireflection coatings. It underlies a double selection concerning on the one hand the nature of the sub-layer and on the other hand the low refractive index layers forming the antireflection stack, and it makes it possible to produce an antireflective optical article having both improved thermal resistance and abrasion resistance properties. It is also based on how to select the location of the multiple layers.

The present objectives are aimed at according to the invention with the provision of an optical article having antireflection properties, comprising a substrate and, starting from the substrate:

a sub-layer comprising a $SiO_2$-based layer, said $SiO_2$-based layer having a thickness greater than or equal to 75 nm and being free from $Al_2O_3$; and a multilayered antireflection coating comprising a stack consisting in at least one high refractive index layer and at least one low refractive index layer, all the low refractive index layers of which comprise a mixture of $SiO_2$ and $Al_2O_3$, and all high refractive index layers of which are not layers that do absorb in the visible region comprising a substoichiometric titanium oxide $TiO_x$ and reducing the visible light transmission factor (τv, hereunder noted Tv), also called relative visible light transmission factor of the optical article by at least 10% as compared to a same article without any of said visible light absorbing layers.

The Tv factor has an international standardized definition (ISO Standard 13666:1998) and is measured in accordance with the ISO Standard 8980-3. It is defined within the wavelength limits ranging from 380 to 780 nm.

The high refractive index layers may contain a substoichiometric titanium oxide, of formula $TiO_x$, wherein x<2, provided they do not reduce the relative visible light transmission factor (Tv) of the optical article of the invention by at least 10% as compared to a same article without any of said visible light absorbing layers. It should indeed be noted that titanium oxide traditionally represented by formula $TiO_2$, is in fact slightly substoichiometric in nature.

According to a particular embodiment of the invention, the optical article of the invention does not absorb in the visible region or only slightly, which means in the context of the present application that its relative visible light transmission factor (Tv) is higher than 90%, more preferably higher than 95%, even more preferably higher than 96% and most preferably higher than 97%.

According to other embodiments, the high refractive index layers of the antireflection coating do not absorb in the visible region; the high refractive index layers of the antireflection coating are free from substoichiometric titanium oxide of formula $TiO_x$, wherein x≤1.5, preferably x≤1.7 and more preferably x≤1.9.

Preferably, the light absorption of the coated article of the invention is lower than or equal to 1%.

Preferably, the mean reflection factor in the visible region (from 400 to 700 nm) of an article coated according to the invention, noted $R_m$, is lower than 2.5% per article face, more preferably is lower than 2% per article face and even more preferably is lower than 1% per article face. In an optimal embodiment, the article has a $R_m$ total value (cumulative reflection values due to the two faces) lower than 1%, preferably ranging from 0.7 to 0.8%.

In this application, the "mean reflection factor" is such as defined in the ISO Standard 13666:1998, and measured in accordance with the ISO Standard 8980-4, that is to say it is the spectrum reflection average of the visible light spectrum as a whole between 400 and 700 nm.

According to the invention, the optical article comprises a substrate, preferably a transparent substrate, made of organic or mineral glass, having main front and rear faces, at least one of said main faces having a sub-layer provided with a multilayered antireflection coating.

In the present invention, a sub-layer based on $SiO_2$ and free from $Al_2O_3$ is used in combination with low refractive index layers based on a mixture of $SiO_2/Al_2O_3$. The present inventors did observe that it is not recommended to use a sub-layer based on $SiO_2/Al_2O_3$, as taught in the Japanese patents H05-011101 and H05-034502, in combination with the antireflection stack of the present invention. Without wishing to be bound by any particular theory, one may suppose that such a sub-layer could induce an excessive compressive stress, which may then result for the article in a delamination and a loss of abrasion resistance.

As used herein, a "sub-layer" or bonding layer means a coating which is deposited onto the substrate (bare or coated) prior to depositing the antireflection stack. The sub-layer must be sufficiently thick in order to promote the antireflection coating abrasion resistance, but preferably not to such an extent that it would generate a light absorption that would significantly decrease the luminous transmittance Tv.

Because it is relatively thick, the sub-layer does not typically take part to the antireflection optical activity. It does not belong to the antireflection stack and does not have any significant optical effect.

The sub-layer comprises a $SiO_2$-based layer that is free from $Al_2O_3$, the thickness of which is greater than or equal to 75 nm, preferably greater than or equal to 80 nm, more preferably greater than or equal to 100 nm and most preferably greater than or equal to 120 nm. Its thickness is typically below 250 nm, more preferably below 200 nm.

The sub-layer may be laminated, that is to say may comprise other layers in addition to the $SiO_2$-based layer that is free from $Al_2O_3$ and which thickness is greater than or equal to 75 nm.

Preferably, the sub-layer comprises a $SiO_2$ layer which thickness is greater than or equal to 75 nm and free from $Al_2O_3$ and at most three layers, preferably at most two layers that are inserted between the optionally coated substrate and this $SiO_2$ layer free from $Al_2O_3$.

Especially when the substrate has a high refractive index (that is to say greater than or equal to 1.55, preferably greater than or equal to 1.57) and when the sub-layer is directly deposited on the substrate or the substrate is coated with an abrasion-resistant coating having a high refractive index (that is to say greater than or equal to 1.55, preferably greater than or equal to 1.57), preferably based on epoxysilanes, and the sub-layer is directly deposited on the abrasion-resistant coating, the sub-layer preferably comprises, in addition to the aforementioned $SiO_2$ layer, a layer having a high refractive index and a weak thickness, lower than or equal to 80 nm, more preferably lower than or equal to 50 nm and even more preferably lower than or equal to 30 nm.

Such a high refractive index layer does directly contact the high refractive index substrate or the high refractive index abrasion-resistant coating.

Alternatively, the sub-layer comprises, in addition to the aforementioned $SiO_2$ layer and the aforementioned high refractive index layer, a layer made of a low refractive index $SiO_2$-based material, free from $Al_2O_3$ or not, onto which the high refractive index layer is deposited.

In that case, the sub-layer typically comprises a 25 nm-thick $SiO_2$ layer, a 10 nm-thick $ZrO_2$ layer, a 160 nm-thick $SiO_2$ layer, deposited in this order starting from the substrate.

A monolayered type sub-layer will be preferably used.

Said $SiO_2$-based layer which thickness is greater than or equal to 75 nm may comprise, in addition to silica, one or more other material(s) traditionally used for making sub-layers, for example one or more material(s) selected from the hereinabove described dielectric materials, except alumina.

The sub-layer of the invention preferably comprises at least 70 weight % of $SiO_2$, more preferably 80 weight % and most preferably 90 weight % of $SiO_2$. In an optimal embodiment of the invention said sub-layer comprises 100 weight % of silica.

In this application, a layer of an antireflection stack is said to be a high refractive index layer (HI) when its refractive index is greater than or equal to 1.6, preferably greater than or equal to 1.7, more preferably greater than or equal to 1.8 and even more preferably greater than or equal to 1.9. A layer of the antireflection stack is said to be a low refractive index layer (LI) when its refractive index is lower than or equal to 1.54, preferably lower than or equal to 1.52, more preferably lower than or equal to 1.50.

Unless otherwise specified, the refractive indices which it is referred to in the present invention are expressed at 25° C. for a wavelength of 550 nm.

The LI layers of the antireflection coating all do comprise a mixture of $SiO_2$ and $Al_2O_3$. In the rest of the description, they will typically be referred to as "$SiO_2/Al_2O_3$ layers".

They may comprise in addition to silica and alumina one or more other materials that are traditionally used for producing an antireflection layer selected for example from the dielectric materials as previously described in this description.

Preferably, the low refractive index layers of the antireflection coating all do preferably consist in a mixture of $SiO_2$ and $Al_2O_3$. Preferably, they do comprise from 1 to 10%, more preferably from 1 to 5% by weight of $Al_2O_3$ as related to the total weight of $SiO_2+Al_2O_3$ in these layers. An excess of alumina affects the antireflection coating performances.

Commercially available $SiO_2/Al_2O_3$ mixtures may be used, such as LIMA® marketed by Umicore Materials AG (refractive index n=1.48-1.50 at 550 nm), or L5® substance marketed by Merck KGaA (refractive index n=1.48 at 500 nm).

Low refractive index layers (LI) based on a mixture of silicon dioxide and aluminum oxide have two main effects as related to low refractive index layers based on silicon dioxide. On the one hand, they enable to improve the life service of the antireflection coating, its environmental stability, especially to the ultraviolet radiation, and on the other hand, they make it possible to rise the temperature at which cracks do appear on the thin film, in other words the coating critical temperature.

The critical temperature of a coated article of the invention is preferably greater than or equal to 80° C., more preferably greater than or equal to 85° C., and most preferably greater than or equal to 90° C.

Without wishing to thereby limit the present invention in its interpretation, the present inventors think that substituting the pure silica with alumina-doped silica, all other characteristics remaining otherwise unchanged, enables to increase the compressive stress of the stack as a whole, thus improving the critical temperature of the article. This is contrary to the teaching of the American patent application 2005/0,219,724, stating that a $SiO_2/Al_2O_3$ layer induces less stress than a $SiO_2$ layer does.

From another viewpoint, a too high compressive stress may lead to adhesion problems and to a loss of abrasion resistance, which will clearly appear upon reading the following examples.

The HI layers are usual high refractive index layers, that are well known in the art. They do typically comprise one or more mineral oxide(s) such as, without limitation, zirconia ($ZrO_2$), titanium oxide ($TiO_2$), tantalum pentoxide ($Ta_2O_5$), neodymium oxide ($Nd_2O_5$), praseodymium oxide ($Pr_2O_3$), praseodymium titanate ($PrTiO_3$), $La_2O_3$, $Dy_2O_5$, $Nb_2O_5$, $Y_2O_3$. Optionally, the high index layers may further comprise silica or alumina, provided that their refractive index is greater than or equal to 1.6, preferably greater than or equal to 1.7, more preferably greater than or equal to 1.8. $TiO_2$, $PrTiO_3$, $ZrO_2$ and mixtures thereof are the most preferred materials.

According to a particular embodiment of the invention, at least one HI layer of the antireflection stack is a layer based on $TiO_2$, the high refractive index of which is particularly interesting. It is preferably deposited by ion assisted deposition (IAD), which increases the compression of this layer and thus its refractive index.

According to another particular embodiment of the invention, at least one HI layer of the antireflection stack is a layer based on $PrTiO_3$, the high heat resistance of which is particularly interesting.

Typically, the HI layers have a physical thickness varying from 10 to 120 nm, and the LI layers have a physical thickness varying from 10 to 100 nm.

Preferably, the total physical thickness of the antireflection coating is lower than 1 micrometer, more preferably lower than or equal to 500 nm and even more preferably lower than or equal to 250 nm. The total physical thickness of the antireflection coating is typically higher than 100 nm, preferably higher than 150 nm. The thickness values mentioned in this application are physical thickness values, unless otherwise specified.

Preferably, the multilayered antireflection coating directly contacts the sub-layer.

More preferably, the multilayered antireflection coating consists in a stack comprising at least two low refractive index layers (LI) and at least two high refractive index layers (HI). Preferably, the antireflection stack total number of layers is less than or equal to 6.

HI layers and LI layers do not necessarily alternate in the stack, although they may alternate according to one embodiment of the present invention. Two HI layers (or more) may be deposited onto each other, as well as two LI layers (or more) may be deposited onto each other. Thus, it is interesting as regards the abrasion resistance to stack each other for example a $ZrO_2$ HI layer and a $TiO_2$ HI layer, rather than using one $TiO_2$ layer instead of these two adjacent HI layers.

Preferably, the $SiO_2$-based layer of the sub-layer is adjacent to a high refractive index layer (HI) of the antireflection stack. More preferably, the first low refractive index layer comprising a mixture of silicon dioxide and aluminum oxide in the stacking order is deposited onto a high refractive index layer and coated with another high refractive index layer, which chemical nature is different or the same.

According to another preferred characteristic, the multilayered, antireflection stack external layer, that is to say its layer that is the most distant from the substrate, is a layer comprising a mixture made of silicon dioxide and aluminum oxide.

It is well known that optical articles tend to become charged with static electricity, particularly when being cleaned under dry conditions by rubbing their surface with a cloth, a piece of synthetic foam or polyester. They can then draw and fix the small particles in their vicinity such as dusts, and this goes on for all the time the charge remains on the article. It is well known in the state of the art that an article may acquire antistatic properties thanks to the presence on its surface of an electrically conductive layer. This method has been applied in patent application WO 01/55752 and in patent EP 0834092. Such layer enables the charge to dissipate rapidly.

"Antistatic" means that the article does possess the ability not to retain and/or develop a substantial electrostatic charge. An article is typically considered as having acceptable antistatic properties when it does not draw and fix dust as well as small particles after one of its surfaces was rubbed by means of a suitable cloth.

There are various methods for quantifying the antistatic properties of a material.

One of such methods does take the material's static potential into account. When the material's static potential (as measured when the article is still uncharged) is 0 KV+/−0.1 KV (absolute value), the material is said to be antistatic, on the contrary when its static potential is different from 0 KV+/−0.1 KV (absolute value), the material is said to be static.

According to another method, the ability for a glass to discharge a static charge after rubbing with a cloth or by any other means suitable for generating an electrostatic charge (corona-applied charge) may be quantified by measuring the dissipation time of said charge. Thus, antistatic glasses do have a discharge time that is about a hundred milliseconds, while it is about several tens of seconds for a static glass.

The article of the invention may be made antistatic by incorporating at least one electrically conductive layer into the antireflection stack. The electrically conductive layer may be located in various locations of the antireflection coating, provided its antireflection properties are not impaired. It can be deposited for example onto the sub-layer of the invention and form the first layer of the antireflection stack. It is preferably located under a low refractive index layer.

The electrically conductive layer must be thin enough not to impair the transparency of the antireflection coating. Typically, its thickness does vary from 0.1 to 150 nm, more preferably from 0.1 to 50 nm, depending on its nature. When it is less than 0.1 nm thick, it does not typically enable to obtain a sufficient electrical conductivity, on the contrary when it is more than 150 nm thick, it does not typically enable to obtain the required transparency and low absorption characteristics.

The electrically conductive layer is preferably made of an electrically conductive and highly transparent material. In that case, its thickness does preferably vary from 0.1 to 30 nm, more preferably from 1 to 20 nm and even more preferably from 1 to 10 nm. Said material is preferably a metal oxide selected from indium, tin, and zinc oxide, as well as mixtures thereof. Indium-tin oxide ($In_2O_3$:Sn, i.e. indium oxide doped with tin) and tin oxide ($In_2O_3$) are preferred. According to an optimal embodiment, the electrically conductive and optically transparent layer is a indium-tin oxide layer, referred to as ITO layer.

Typically, the electrically conductive layer does contribute to obtain the antireflection properties and form a high refractive index layer in the antireflection coating. That is the case when layers are made of an electrically conductive and highly transparent material such as the ITO layers.

The electrically conductive layer may also be a layer made of a very thin noble metal that is typically less than 1 nm thick, more preferably less than 0.5 nm thick.

Particularly advantageously, the antireflection stack comprises five dielectric layers, and optionally one electrically conductive layer which gives the article antistatic properties.

According to a preferred embodiment, a $SiO_2$ sub-layer with a thickness preferably greater than or equal to 75 nm, a $ZrO_2$ layer, typically with a thickness ranging from 10 to 40 nm and preferably from 15 to 35 nm, a $SiO_2/Al_2O_3$ layer with a thickness typically ranging from 10 to 40 nm and preferably from 15 to 35 nm, a $TiO_2$ layer, typically with a thickness ranging from 40 to 150 nm and preferably from 50 to 120 nm, a $ZrO_2$ layer, typically with a thickness ranging from 10 to 30 nm and preferably from 10 to 25 nm, optionally an electrically conductive layer, preferably an ITO layer, typically with a thickness ranging from 0.1 to 30 nm and preferably from 1 to 20 nm, and a $SiO_2/Al_2O_3$ layer, typically with a thickness ranging from 40 to 150 nm and preferably from 50 to 100 nm are successively deposited starting from the substrate surface. It is preferred that the antireflection stack of the invention does comprise an electrically conductive layer, more preferably, the article of the invention does comprise a stack such as $TiO_2/ZrO_2$/electrically conductive layer.

According to a particularly preferred embodiment, a $SiO_2$ sub-layer with a thickness greater than or equal to 120 nm, a $ZrO_2$ layer with a thickness ranging from 20 to 30 nm, a $SiO_2/Al_2O_3$ layer with a thickness ranging from 20 to 30 nm, a $TiO_2$ layer with a thickness ranging from 75 to 105 nm, a $ZrO_2$ layer with a thickness ranging from 10 to 20 nm, an ITO layer with a thickness ranging from 2 to 20 nm, and a SiO$_2$/Al$_2$O$_3$ layer with a thickness ranging from 60 to 90 nm are successively deposited, starting from the substrate surface.

The three successive TiO$_2$/ZrO$_2$/electrically conductive layer (preferably ITO) layers are preferably deposited with ion assistance (IAD).

Such an article does possess an excellent abrasion resistance, as measured using the BAYER test.

Generally speaking, the sub-layer and the antireflection coating of the optical article according to the invention may be deposited onto any substrate, preferably a transparent substrate, made of organic or mineral glass, and preferably onto organic glass substrates such as for example a thermoplastic or a thermosetting material.

Thermoplastic materials that may be suitably used for the substrates include (meth)acrylic (co)polymers, especially methyl poly(methacrylate) (PMMA), thio(meth)acrylic (co) polymers, polyvinylbutyral (PVB), polycarbonates (PC), polyurethanes (PU), poly(thiourethanes), polyol allylcarbonate (co)polymers, thermoplastic copolymers of ethylene and vinyl acetate, polyesters such as polyethylene terephtalate (PET) or polybutylene terephtalate (PBT), polyepisulfides, polyepoxides, copolymers of polycarbonates and polyesters, copolymers of cycloolefins such as copolymers of ethylene and norbornene or ethylene and cyclopentadiene, and combinations thereof.

As used herein a "(co)polymer" means a copolymer or a polymer. A (meth)acrylate is an acrylate or a methacrylate.

The preferred substrates according to the invention include for example the substrates obtained by polymerizing alkyl (meth)acrylates, especially C$_1$-C$_4$ alkyl (meth)acrylates, such as methyl (meth)acrylate and ethyl (meth)acrylate, polyethoxylated aromatic (meth)acrylates such as polyethoxylated bisphenol di(meth)acrylates, allyl derivatives such as aliphatic or aromatic, linear or branched polyol allylcarbonates, thio(meth)acrylates, episulfides and precursor mixtures of polythiols and polyisocyanates (for obtaining polythiourethanes).

As used herein a "polycarbonate" (PC) means both the homopolycarbonates and the copolycarbonates and the block copolycarbonates. Polycarbonates are commercially available for example from GENERAL ELECTRIC COMPANY under the trade name LEXAN®, from TEIJIN under the trade name PANLITE®, from BAYER under the trade name BAYBLEND®, from MOBAY CHEMICHAL Corp. under the trade name MAKROLON® and from DOW CHEMICAL Co. under the trade name CALIBRE®.

Suitable examples of polyol allyl carbonate (co)polymers include (co)polymers of ethylene glycol bis(allyl carbonate), of diethylene glycol bis 2-methyl carbonate, of diethylene glycol bis(allyl carbonate), of ethylene glycol bis(2-chloro allyl carbonate), of triethylene glycol bis(allyl carbonate), of 1,3-propanediol bis(allyl carbonate), of propyleneglycol bis (2-ethyl allyl carbonate), of 1,3-butenediol bis(allyl carbonate), of 1,4-butenediol bis(2-bromo allyl carbonate), of dipropyleneglycol bis(allyl carbonate), of trimethylene glycol bis(2-ethyl allyl carbonate), of pentamethylene glycol bis(allyl carbonate), of isopropylene bisphenol-A bis(allyl carbonate).

Particularly recommended substrates are those substrates obtained by (co)polymerizing bis allyl carbonate of diethylene glycol, marketed, for example, under the trade name CR-39® by PPG Industries (ESSILOR ORMA® lenses).

The particularly recommended substrates also include those substrates obtained by polymerizing thio(meth)acrylic monomers, such as those described in the French patent application FR 2734827.

Of course the substrates may be obtained by polymerizing mixtures of the hereinabove mentioned monomers, or they also may comprise mixtures of such polymers and (co) polymers.

The organic substrates that are preferred in the context of the present invention are those which thermal expansion coefficient does range from $50.10^{-6}$ C.$^{-1}$ to $180.10^{-6}$ C.$^{-1}$, and preferably from $100.10^{-6}$ C.$^{-1}$ to $180.10^{-6}$ C.$^{-1}$.

According to the present invention, the sub-layer et the antireflection stack may be deposited onto the front face and/or the rear face of the substrate. They are preferably deposited onto the front and rear faces of the substrate.

As used herein, the "rear face" of the substrate means the face which, when wearing the article, is located the nearest to the wearer's eye. On the contrary, the "front face" of the substrate means the face which, when wearing the article, is the most distant from the wearer's eye.

Before depositing the sub-layer onto the optionally coated substrate for example with an abrasion-resistant, epoxysilane-based coating, the surface of said substrate is usually submitted to a treatment for increasing the adhesion of the sub-layer which is typically conducted under vacuum, such as a bombardment with energetic species, for example an ion beam ("Ion Pre-Cleaning" or "IPC"), a corona discharge, an ion spallation treatment or a plasma treatment under vacuum. Thanks to these cleaning treatments, the cleanness of the substrate surface is optimized. An ion bombardment treatment is preferred.

The various layers forming the multilayered stack, the so called "optical layers", and the sub-layer are preferably deposited by vacuum deposition according to any one of following methods: i) by evaporation, optionally ion beam assisted; ii) by ion beam sputtering; iii) by cathode sputtering; iv) by plasma-assisted chemical vapour deposition. These different methods are described in "Thin Film Processes" and "Thin Film Processes II," Vossen & Kern, Ed., Academic Press, 1978 and 1991, respectively. Said evaporation under vacuum is a particularly recommended method.

The electrically conductive layer, that is typically a high refractive index layer of the antireflection stack, may be deposited according to any suitable method, for example by vacuum deposition, by evaporation, preferably by ion beam assisted deposition (IAD), or by a cathode sputtering or ion beam method.

The transparency and electrical characteristics of the electrically conductive layer as is well known in the state of the art, depend, inter alia, from a precise control of the oxygen amount during the coating process.

As previously mentioned, it is possible to conduct a treatment step with energetic species, in particular with ions, while concomitantly depositing one or more of the various hereinabove mentioned layers. Depositing the layers of the antireflection stack (amongst which the electrically conductive layer) and the sub-layer may in particular be conducted with ion assistance ("IAD method"=Ion Assisted Deposition). Such method does consist in compacting said layers with heavy ions, while being formed so as to increase their density. In addition to a densification, it enables to improve the adherence of the deposited layers and to increase their refractive index.

As used herein, the "energetic species" are species defined as having an energy ranging from 1 to 150 eV, preferably from 10 to 150 eV, and more preferably from 40 to 150 eV. The energetic species may be chemical species such as ions, radicals or species such as photons or electrons.

IAD and ion treatment surface preparation operations may be conducted by means of an ion gun (Commonwealth Mark II type for example); wherein ions are particles consisting of gas atoms of which one or more electron(s) have been extracted. They preferably consist in bombarding the surface to be treated with argon ions (Ar$^+$), which current density ranges from 10 to 100 µA/cm$^2$ onto the activated surface and under a residual pressure in the vacuum chamber typically varying from $8.10^{-5}$ mbar to $5\ 2.10^{-4}$ mbar.

The sub-layer and the antireflection stack may be directly deposited onto a bare substrate. In some applications, it is preferred that the main surface of the substrate be coated with an abrasion-resistant layer and/or an anti-scratch layer, with an impact-resistant primer layer or with an impact resistant primer layer and an abrasion-resistant layer and/or an anti-scratch layer, in this order. Other coatings that are traditionally used may also be employed.

The sub-layer and the antireflection coating are preferably deposited onto an abrasion-resistant and/or an anti-scratch coating. The abrasion-resistant and/or anti-scratch coating may be any layer traditionally used as an abrasion-resistant and/or an anti-scratch coating in the field of ophthalmic lenses.

The abrasion-resistant and/or anti-scratch coatings are preferably hard coatings based on poly(meth)acrylates or silanes.

The hard abrasion-resistant and/or anti-scratch coatings are preferably produced from compositions comprising at least one alkoxysilane and/or one hydrolyzate thereof, obtained for example by hydrolysis with a hydrochloric acid solution. After the hydrolysis step, which duration does typically range from 2 h to 24 h, preferably from 2 h to 6 h, catalysts may optionally be added. A surfactant compound is preferably also added so as to optimize the optical quality of the deposition.

Recommended coatings according to the present invention include coatings based on epoxysilane hydrolyzates such as those described in the patents FR 2,702,486 (EP 0,614,957), U.S. Pat. No. 4,211,823 and U.S. Pat. No. 5,015,523.

A preferred abrasion-resistant and/or anti-scratch coating composition is the one disclosed in the French patent FR 2,702,486, in the name of the applicant. It comprises an epoxy trialkoxysilane and dialkyl dialkoxysilane hydrolyzate, colloidal silican and a catalytic amount of a curing catalyst based on aluminum such as aluminum acetyl acetonate, the rest being for the most part solvents that are traditionally used for formulating such compositions. Preferably the hydrolyzate used is a γ-glycidoxypropyl trimethoxysilane (GLYMO) and dimethyldiethoxysilane (DMDES) hydrolyzate.

The abrasion-resistant and/or anti-scratch coating composition may be deposited onto the substrate's main surface by dipping or spin-coating. It is then cured according to the appropriate method (preferably a thermal or an ultraviolet method).

The thickness of the abrasion-resistant and/or anti-scratch coating does typically vary from 2 to 10 µm, preferably from 3 to 5 µm.

Before depositing the abrasion-resistant and/or anti-scratch coating, a primer coating may be deposited onto the substrate to improve the impact resistance and/or the adhesion of the following layers in the final product.

This coating may be any impact-resistant primer layer traditionally used for articles made of a transparent polymeric material, such as ophthalmic lenses.

Preferred primer compositions include compositions based on thermoplastic polyurethanes, such as those described in the Japanese patents JP 63-141001 and JP 63-87223, the poly(meth)acrylic type primer compositions, such as those described in the U.S. Pat. No. 5,015,523, thermosetting polyurethane based compositions, such as those described in the European patent EP 0404111 and compositions based on poly(meth)acrylic type latex or polyurethane type latex, such as those described in the U.S. Pat. No. 5,316,791 and EP 0680492.

The preferred primer compositions are compositions based on polyurethanes and compositions based on latex, especially polyurethane type latices.

Poly(meth)acrylic type latices are copolymer latices mainly based on a (meth)acrylate, such as for example ethyl, butyl, methoxyethyl or ethoxyethyl (meth)acrylate, with a typically minor amount of at least one other co-monomer, such as for example styrene.

Preferred poly(meth)acrylic type latices are latices based on acrylate-styrene copolymers. Such latices of acrylate-styrene copolymers are commercially available from ZENECA RESINS under the trade name NEOCRYL®.

Polyurethane type latices are also known and commercially available. As an example, polyurethane type latices with polyester units are appropriate. Such latices are also marketed by ZENECA RESINS under the trade name NEO-REZ® and by BAXENDEN CHEMICALS under the trade name WITCOBOND®.

Mixtures of these latices may also be used in the primer compositions, especially polyurethane type and poly(meth) acrylic type latices.

These primer compositions may be deposited on the article faces by dipping or spin-coating, then be dried at a temperature of at least 70° C. and up to 100° C., preferably of about 90° C., during a time period ranging from 2 minutes to 2 hours, typically of about 15 minutes, to form primer layers which post-curing thickness does range from 0.2 to 2.5 µm, preferably from 0.5 to 1.5 µm.

Of course, the optical article according to the invention may also comprise coatings formed on the antireflection coating that might be able to modify their surface properties, such as hydrophobic coatings and/or oleophobic coatings (anti-fouling top coat). These coatings are preferably deposited onto the antireflection coating external layer. Their thickness is generally lower than or equal to 10 nm, and does preferably range from 1 to 10 nm, more preferably from 1 to 5 nm.

They are generally fluorosilane or fluorosilazane type coatings. They may be obtained by depositing a fluorosilane or fluorosilazane precursor, comprising preferably at least two hydrolyzable groups per molecule. Fluorosilane precursors preferably have fluoropolyether moieties and more preferably perfluoropolyether moieties. These fluorosilanes are well known and are described, inter alia, in the U.S. Pat. Nos. 5,081,192, 5,763,061, 6,183,872, 5,739,639, 5,922, 787, 6,337,235, 6,277,485 and EP 0933377.

Typically, an optical article of the invention comprises a substrate that is successively coated with an impact-resistant primer layer, an abrasion-resistant and/or an anti-scratch layer, a sub-layer of the invention, an antireflection coating of the invention and with a hydrophobic and/or oleophobic coating. The article of the invention is preferably an optical lens, more preferably an ophthalmic lens, or an optical or ophthalmic lens blank.

The present invention also relates to a method for producing an optical article having antireflection properties as defined hereinabove, wherein all layers belonging to the sub-layer, then all layers belonging to the antireflection coating were deposited by evaporation under vacuum. Such a method makes it advantageously possible to avoid heating the substrate, which is particularly interesting in the case of organic glass.

The following examples illustrate the invention in more detail but without limitation.

EXAMPLES

1. General Procedures

Figure 1:
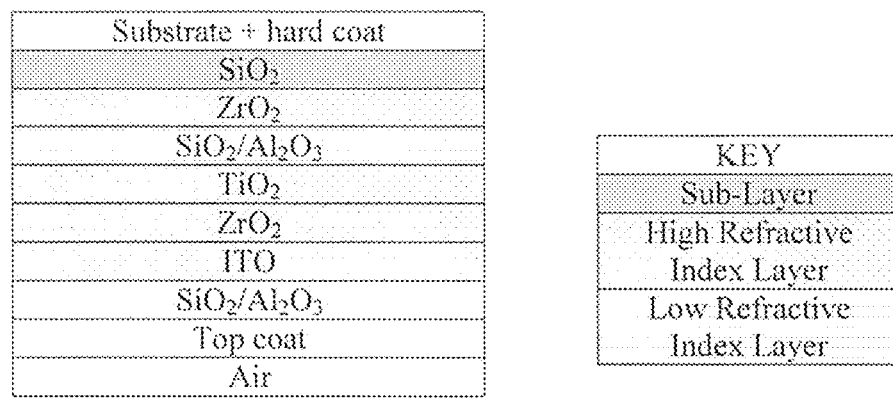
FIG. 1 shows a drawing of Examples 1 and 4 of the invention.
Figure 2:
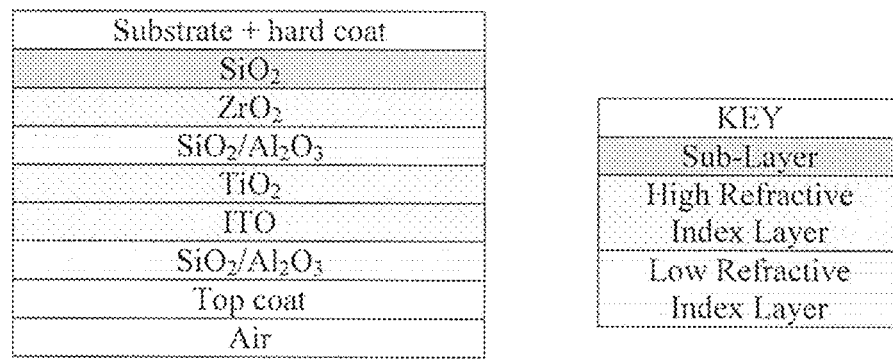
FIG. 2 shows a drawing of Example 2 of the invention.

Optical articles employed in the examples comprise a substrate for an ORMA® ESSILOR lens having a 65 mm diameter, with a power of −2.00 dioptres and a thickness of 1.2 mm, coated with the abrasion-resistant and/or anti-scratch coating (hard coat) disclosed in example 3 of the patent EP 0614957 (refractive index 1.50), based on a hydrolyzate of GLYMO and DMDES, of colloidal silica and aluminum acetyl acetonate. This abrasion-resistant coating was obtained by depositing and curing of a composition comprising by weight, 224 parts of GLYMO, 80.5 parts of HCl 0.1 N, 120 parts of DMDES, 718 parts of a 30 weight % colloidal silica in methanol, 15 parts of aluminum acetyl acetonate and 44 parts of ethylcellosolve. The composition also comprised 0.1% of the surfactant FLUORAD™ FC-430® (3M) by weight as related to the total weight de the composition. This abrasion-resistant coating was deposited directly onto the substrate.

The sub-layers and the antireflection coating layers were deposited without heating of the substrates by evaporation under vacuum, optionally ion beam assisted where indicated (evaporation source: electron gun).

The $SiO_2/Al_2O_3$ mixture used is the substance LIMA® marketed by Umicore Materials AG and comprising 4% by weight of $Al_2O_3$ as related to the total weight of $SiO_2+Al_2O_3$ (examples 1, 2, 3, 5) or the substance L5® marketed by Merck KGaA (example 4).

The deposition frame is a Leybold 1104 equipment provided with an ion gun ESV14 (8 kV) for evaporating the oxides, with a Joule effect pot for depositing the top coat and with an ion gun (Commonwealth Mark II) for the preliminary phase for the surface preparation with argon ions.

The layer thickness is controlled by means of a quartz microbalance.

2. Procedures

Examples 1 to 7

The deposition process implies an introduction step of the article into a vacuum deposition chamber, a pumping step, an ionic surface preparation step using an argon ion beam (IPC) (pressure of $2.10^{-5}$ mBar), a deposition step for the LI abrasion-resistant sub-layer ($SiO_2$ or $SiO_2/Al_2O_3$) at a rate of 1 nm/s, the deposition for the first HI layer ($ZrO_2$) at a rate of 0.3 nm/s, the deposition for the first LI layer ($SiO_2$ or $SiO_2/Al_2O_3$) at a rate of 0.7 nm/s, the deposition for the second HI layer ($TiO_2$) at a pressure of $1.10^{-4}$ mBar at a rate ranging from 0.3 to 0.5 nm/s and with an oxygen ion assistance corresponding to 2.5 A-120 V, then the deposition for the third HI layer ($ZrO_2$) at a rate of 0.3 nm/s (except for examples 2, 5, 7), the deposition for an ITO layer at a rate ranging from 0.3 to 0.5 nm/s and with an oxygen ion assistance corresponding to 2.5 A-120 V, (except for examples 3 and 6), the deposition for the second LI layer ($SiO_2$ or $SiO_2/Al_2O_3$) at a rate of 1 nm/s, a deposition step for an antifouling coating (top coat) and a ventilation step.

Example 8

The deposition process implies an introduction step of the article into a vacuum deposition chamber, a pumping step, an ionic surface preparation step using an argon ion beam (IPC) (pressure of $1.10^{-4}$ mBar), the deposition for the first HI layer ($ZrO_2$) under $O_2$ atmosphere at a pressure of $8.10^{-5}$ mBar and at a rate of 0.3 nm/s, the deposition for the first LI layer ($SiO_2$) at a rate of 0.7 nm/s, the deposition for the second HI layer ($ZrO_2$) under $O_2$ atmosphere regulation at a pressure of $8.10^{-5}$ mBar at a rate of 0.3 nm/s, the deposition for the second LI layer ($SiO_2$) at a rate of 1 nm/s, a deposition step for an antifouling coating (top coat) and a ventilation step.

3. Characterizations a. Characterization of the Thermal Resistance: Evaluation of the Critical Temperature The ophthalmic organic glass coated with an antireflection coating was placed for one hour in a thermoregulated oven, at a temperature T of 50° C., then was withdrawn from the oven and its visual appearance was evaluated by light reflection under a desk lamp. If the antireflection coating seemed to be intact, the ophthalmic organic glass was placed in the oven again for one additional hour at a temperature T+5° C. As soon as crackings were observed on the antireflection coating, the test was stopped. The critical temperature corresponds to that temperature at which cracks do appear.

Where several glasses were tested, the mentioned crack formation temperature corresponds to the average of the results.

b. Characterization of the Abrasion Resistance

The abrasion resistance was evaluated by determining the BAYER value on substrates provided with a sub-layer (except for example 8) and with an antireflection coating.
ASTM BAYER Test (Bayer Sand Test)

Determining such a BAYER value was conducted in accordance with the ASTM Standard F 735.81. The higher the BAYER test value the stronger the abrasion resistance is.

This test consists in simultaneously stirring a glass sample and a glass specimen with an alternating movement in a tank comprising an abrasive powder (sand) with a defined particle size at a frequency of 100 cycles/minute during 2 minutes. The H diffusion measurement "before/after" of a glass sample was compared to that of a glass specimen, here a CR-39®-based bare glass for which the BAYER value was fixed to 1.

The BAYER value is R=H glass specimen/H glass sample.
ISTM Bayer Test (Bayer Alumina)

Determining such a BAYER value was conducted according to the ASTM Standard F735-81, with following modifications:

Abrasion is conducted on 300 cycles using approximately 500 g of alumina (aluminum oxide $Al_2O_3$) ZF 152412 provided by Ceramic Grains (formerly Norton Materials, New Bond Street, PO Box 15137 Worcester, Mass. 01615-00137). The diffusion is measured by means of a Hazemeter model XL-211.

The ASTM Bayer value (Bayer sand) is considered to be satisfying when R is greater than or equal to 3.4 and is lower than 4.5.

The ISTM Bayer value is considered to be satisfying when R is greater than or equal to 3 and is lower than 4.5.

The Bayer sand value or ISTM value is considered as being excellent for values of 4.5 and above.

4. Results

The stacks obtained according to the examples 1 to 8 are detailed hereafter on following page. The results of the critical temperature measurements (CT, ° C.) and of the abrasion resistance evaluation are listed in Table 1.

TABLE 1

| Example | CT (24 hours) ° C. | ASTM Bayer Test (Bayer sable) | ISTM Bayer Test |
|---|---|---|---|
| Ex. 1 (invention) | 85 | 4.7 | 11 |
| Ex. 2 (invention) | 93 | 4.3 | 8.7 |
| Ex. 3 (comparative) | 93 | 2.9 | |
| Ex. 4 (invention) | 88 | 4.8 | 13 |
| Ex. 5 (comparative) | 96 | 3.8 | 5.6 |
| Ex. 6 (comparative) | 70 | 3.8 | |
| Ex. 7 (comparative) | 83 | 4.3 | 8.5 |
| Ex. 8 (comparative) | 70 | 5.0 | 8.5 |

The lens of example 8 (traditional four-layer antireflection coating) is very resistant to abrasion but its critical temperature is only 70° C.

The lenses of examples 1, 2 and 4 according to the invention do possess both an excellent abrasion resistance and a high critical temperature. Example 4 gives the best compromise between these two properties. Comparing the example 1 with the example 2 reveals that using two high refractive index layers of $TiO_2/ZrO_2$ side by side rather than one single $TiO_2$ layer improves the abrasion resistance while only slightly reducing the critical temperature. On the other side, interleaving a $ZrO_2$ layer between a $TiO_2$ layer and an ITO layer enables to reduce diffusion as compared to an article wherein an ITO and a $TiO_2$ layer are placed side by side.

The lenses of the examples 3 and 5 have a good thermal resistance thanks to the mixture $SiO_2/Al_2O_3$ being present in the low refractive index layers and in the sub-layer, but they do have a poor abrasion resistance, particularly for the example 3. Surprisingly, it has been observed that it was not advantageous to use a sub-layer comprising a mixture of $SiO_2$ and $Al_2O_3$ (a direct comparison between the examples 2 and 5 may be made). Without wishing to be bound by any particular theory, the present inventors think that the increase in the stack's global compressive stress resulting from the substitution of the silica with alumina-doped silica, becomes indeed too high, thus weakening the stack layer adhesion and affecting the abrasion test response.

The lenses of the examples 6 and 7, which low refractive index layers of the antireflection coating consist in $SiO_2$, have a relatively low critical temperature. Comparing the example 2 with the example 7 reveals that substituting both $SiO_2$ low refractive index layers with two $SiO_2/Al_2O_3$ low refractive index layers, all other characteristics remaining otherwise unchanged, has no influence on the abrasion resistance, but on the contrary does result in a significant rise in the critical temperature (+10° C.).

It has been controlled using the spectrophotometer such as the lambda 900 of Perkin Elmer that the relative visible light transmission factor Tv of the articles of the invention, calculated within the wavelength limits ranging from 380 to 780 nm, was higher than 90%.

LENS FORMULATION PREPARED IN THE EXAMPLES

| Example 1 (invention) Substrate + hard coat | | Example 2 (invention) Substrate + hard coat | |
|---|---|---|---|
| *SiO₂* | *150 nm* | *SiO₂* | *150 nm* |
| ZrO₂ | 24 nm | ZrO₂ | 24 nm |
| SiO₂/Al₂O₃ | 23 nm | SiO₂/Al₂O₃ | 23 nm |
| TiO₂ | 90 nm | TiO₂ | 98 nm |
| ZrO₂ | 15 nm | ITO | 13 nm |
| ITO | 13 nm | SiO₂/Al₂O₃ | 77 nm |
| SiO₂/Al₂O₃ | 77 nm | | |
| Top coat Air | | Top coat Air | |

| Example 3 (comparative) Substrate + hard coat | | Example 4 (invention) Substrate + hard coat | |
|---|---|---|---|
| *SiO₂/Al₂O₃* | *150 nm* | *SiO₂* | *150 nm* |
| ZrO₂ | 22 nm | ZrO₂ | 24 nm |
| SiO₂/Al₂O₃ | 28 nm | SiO₂/Al₂O₃* | 23 nm |
| TiO₂ | 101 nm | TiO₂ | 90 nm |
| ZrO₂ | 15 nm | ZrO₂ | 15 nm |
| SiO₂/Al₂O₃ | 76 nm | ITO | 13 nm |
| | | SiO₂/Al₂O₃ | 77 nm |
| Top coat Air | | Top coat Air | |

| Example 5 (comparative) Substrate + hard coat | | Example 6 (comparative) Substrate + hard coat | |
|---|---|---|---|
| *SiO₂/Al₂O₃* | *150 nm* | *SiO₂* | *150 nm* |
| ZrO₂ | 24 nm | ZrO₂ | 22 nm |
| SiO₂/Al₂O₃ | 23 nm | SiO₂ | 28 nm |
| TiO₂ | 98 nm | TiO₂ | 101 nm |
| ITO | 13 nm | ZrO₂ | 15 nm |
| SiO₂/Al₂O₃ | 77 nm | SiO₂ | 76 nm |
| Top coat Air | | Top coat Air | |

| Example 7 (comparative) Substrate + hard coat | | Example 8 (comparative) Substrate + hard coat | |
|---|---|---|---|
| *SiO₂* | *150 nm* | ZrO₂ | 27 nm |
| ZrO₂ | 24 nm | SiO₂ | 21 nm |
| SiO₂ | 23 nm | ZrO₂ | 80 nm |
| TiO₂ | 98 nm | SiO₂ | 81 nm |
| ITO | 13 nm | | |
| SiO₂ | 77 nm | | |
| Top coat Air | | Top coat Air | |

*SiO₂/Al₂O₃: L5 ® substance (Merck KGaA).
The sub-layers appear in italics.
The high refractive index layers appear in bold.

The invention claimed is:

1. An optical article having antireflection properties, which comprises a substrate and, starting from the substrate:
   a sub-layer comprising a $SiO_2$-based layer, said $SiO_2$-based layer having a thickness greater than or equal to 75 nm and being free from $Al_2O_3$, a $ZrO_2$ layer with a thickness ranging from 10 to 40 nm, a $SiO_2/Al_2O_3$ layer with a thickness ranging from 10 to 40 nm, a $TiO_2$ layer with a thickness ranging from 40 to 150 nm, a $ZrO_2$ layer with a thickness ranging from 10 to 30 nm, an electrically conductive layer with a thickness ran in from 0.1 to 30 nm and a $SiO_2/Al_2O_3$ layer with a thickness ranging from 40 to 150 nm; and
   a multilayered antireflection coating comprising a stack consisting of at least one high refractive index layer and at least one low refractive index layer, wherein all the low refractive index layers of the antireflection coating comprise a mixture of $SiO_2$ and $Al_2O_3$, and wherein the high refractive index layers of the antireflection coating either
  (i) do not comprise a substoichiometric titanium oxide that absorbs in the visible region; or
  (ii) do comprise a substoichiometric titanium oxide that absorbs in the visible region, but do not reduce the relative visible light transmission factor (Tv) of said optical article by more than 10% as compared to a same article without any said layers that comprise a substoichiometric titanium oxide and absorb in the visible region.

2. The article of claim 1, wherein the relative visible light transmission factor (Tv) is higher than 90%.

3. The article of claim 1, wherein the mean reflection factor per article face in the visible region (Rm) is lower than 2.5%.

4. The article of claim 1, wherein the critical temperature is greater than or equal to 80° C.

5. The article of claim 1, wherein said $SiO_2$-based layer that is free from $Al_2O_3$ has a thickness which is greater than or equal to 80 nm.

6. The article of claim 1, wherein all the low refractive index layers of the antireflection coating comprise from 1 to 10% by weight of $Al_2O_3$ as compared to the total weight of $SiO_2+Al_2O_3$ in these layers.

7. The article of claim 1, wherein the high refractive index layers of the antireflection coating comprise at least one material selected from $TiO_2$, $PrTiO_3$, $ZrO_2$ and mixtures thereof.

8. The article of claim 1, wherein the $TiO_2$-based layer has been deposited with ion assistance.

9. The article of claim 1, wherein the antireflection coating comprises a $TiO_2$-based layer and a $ZrO_2$-based layer deposited onto each other.

10. The article of claim 1, wherein the electrically conductive layer comprises a metal oxide selected from indium, tin or zinc oxides, and mixtures thereof.

11. The article of claim 10, wherein the metal oxide is indium-tin oxide.

12. The article of claim 1, wherein the electrically conductive layer has been deposited with ion assistance.

13. The article of claim 1, wherein the substrate is an organic or a mineral glass.

14. The article of claim 1, wherein the substrate is an organic glass which thermal expansion coefficient ranges from $50.10^{-6}$ $C.^{-1}$ to $180.10^{-6}$ $C.^{-1}$.

15. The article of claim 1, wherein the substrate is coated with an abrasion-resistant and/or an anti-scratch layer, with an impact-resistant primer layer, or with an impact-resistant primer layer provided with an abrasion-resistant and/or an anti-scratch layer.

16. The article of claim 1, further defined as an optical lens.

17. A method for producing an optical article having antireflection properties of claim 1 comprising:
  depositing all layers belonging to the sub-layer by evaporation under vacuum; and
  depositing all layers belonging to the antireflection coating.

18. The method of claim 17, further comprising cleaning the substrate surface before depositing the sub-layer, wherein said cleaning comprises a bombardment with energetic species, a corona discharge treatment, an ion spallation and/or a plasma treatment under vacuum.

19. The method of claim 18, wherein the cleaning treatment comprises an ionic bombardment.

* * * * *